Dec. 20, 1966   B. F. EHRLICH   3,292,728
DETECTION OF INSTANTS OF DETONATION OF EXPLOSIVE CHARGES
Filed Jan. 25, 1965
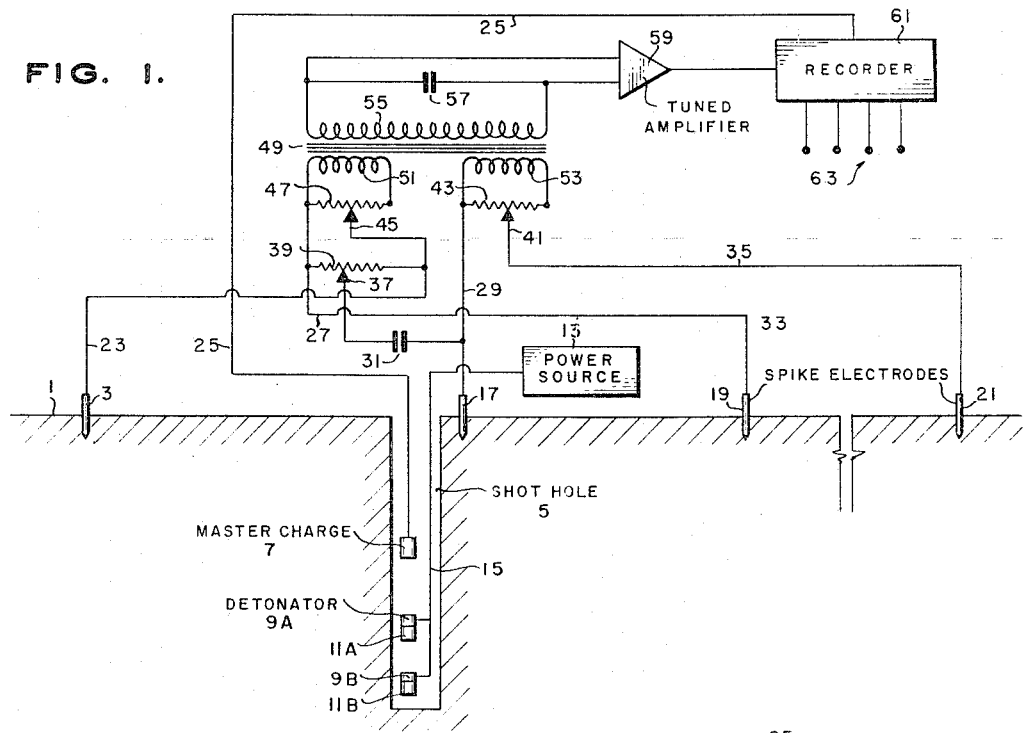
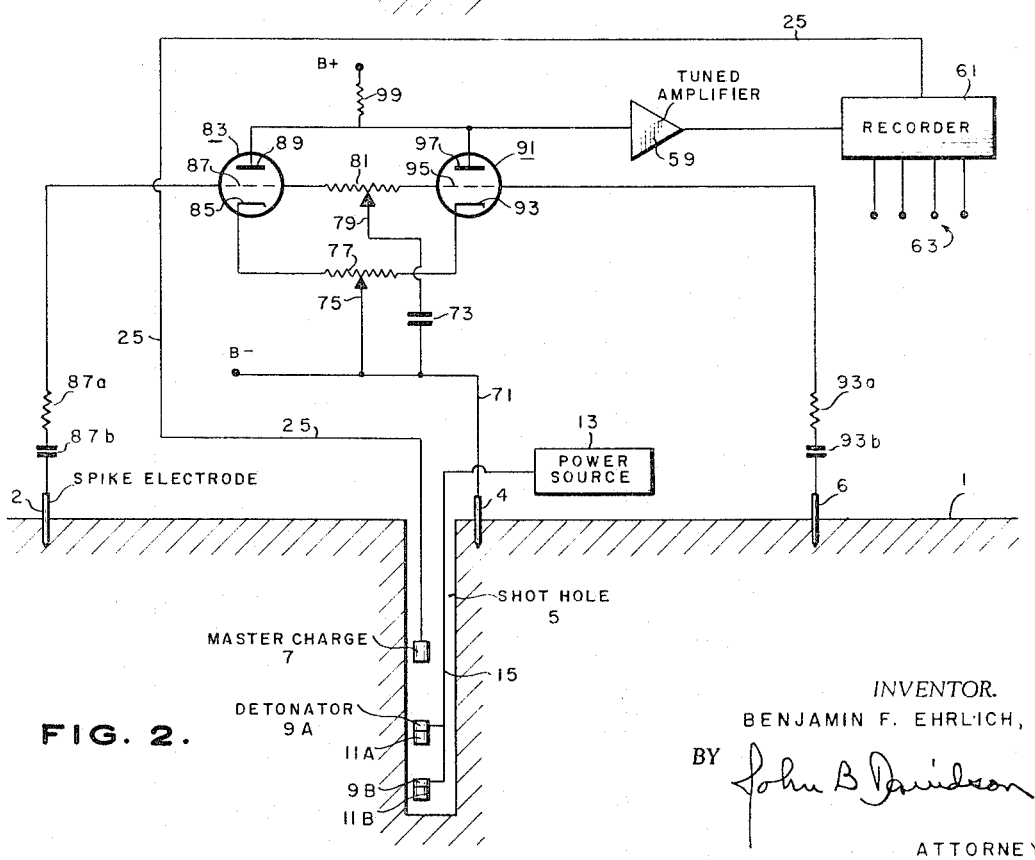
INVENTOR.
BENJAMIN F. EHRLICH,
BY John B. Davidson
ATTORNEY.

United States Patent Office 3,292,728
Patented Dec. 20, 1966

3,292,728
DETECTION OF INSTANTS OF DETONATION OF EXPLOSIVE CHARGES
Benjamin F. Ehrlich, Houston, Tex., assignor to Esso Production Research Company, Houston, Tex., a corporation of Delaware
Filed Jan. 25, 1965, Ser. No. 427,907
7 Claims. (Cl. 181—.5)

This invention relates to seismic prospecting, and more particularly to the determination of times of detonation of seismic explosives.

The general method of geophysical exploration utilizing seismic waves in the earth is well known. Briefly stated, this method comprises the steps of initiating a seismic impulse at or near the surface of the earth and recording signals generated by geophones as a result of the earth's movement at one or more points more or less spaced from the point of origin of the seismic impulse. The recording must permit measurement of the time elapsing between the instant of the origination of the impulse and the generation of signals as the result of the subsequent earth movement. The original impulse will set up seismic waves that are transmitted through the earth. Any discontinuity or variation of structure within the earth will reflect and/or refract a portion of the energy in the waves so that a recording of the signals from the receiving point will comprise a number of arriving waves, each derived from the original impulse and each differing from the others in time of arrival, magnitude, and wave shape, or all three. The usual type of seismogram produced by the technique described above comprises a plurality of traces varying in amplitude along a time axis from a common reference point, termed the "time break." The traces are recorded side by side so that the events thereon produced by reflections from a given discontinuity may be identified by the manner in which they line up across the record. Manifestly, a multiplicity of traces are required in order to distinguish between reflections and noise.

A modification of the technique involves the detonation of two or more vertically spaced-apart explosive charges in a predetermined time sequence for the purpose of reinforcing downgoing seismic waves produced by the topmost charge, and for the purpose of at least partially cancelling ghost reflections. Connected to the charges below the topmost charge and lowered into the earth with such charges is apparatus for detecting the arrival of seismic waves produced by the topmost charge and for producing an electrical signal responsive to detection of the seismic waves for detonating the lower charges. Other devices also are used for this purpose, such as line explosives somewhat similar to Primacord, which are connected between the explosive charges to detonate the lower charge or charges responsive to detonation of the uppermost charge.

The determination of the instant of detonation of the topmost charge is relatively simple inasmuch as this corresponds almost exactly to the instant at which a switch is closed to detonate the charge. However, the instants of detonation of the lower charges are somewhat variable, and heretofore it has not been possible to determine with precision the instants of detonation of the lowermost charges. Furthermore, on occasion the lower charges do not explode, and it is most desirable to be able to detect such an occurrence.

A phenomenon that has been reported in the literature is that when a nuclear charge is detonated, an electromagnetic pulse is formed in the hot gases resulting from the detonation. It has now been discovered that such pulses are produced by seismic charges and can be detected to produce a very accurate time determination of the instant of detonation of seismic charges.

In accordance with one aspect of the invention, time information is transmitted from one location to another by detonating an explosive charge at one location, and detecting electromagnetic waves produced thereby at the other location, which electromagnetic waves have a frequency of at least three kilocycles.

According to a more specific aspect of the invention, a plurality of explosive charges are vertically spaced apart at different levels in the earth, one of the explosive charges is detonated, and each of the other explosive charges is detonated responsive to arrival thereat of the seismic waves produced by the one explosive charge. The instant of detonation of each of the explosive charges can be determined by detecting at the earth's surface above the explosive charges electromagnetic waves having frequencies above three kilocycles, producing an electrical signal responsive to such detection, and producing a record trace of said electrical signal.

Objects and features of the invention not apparent from the above discussion will become evident upon consideration of the following detailed description thereof taken in connection with the accompanying drawings, wherein:

FIG. 1 is an electrical schematic diagram of a preferred embodiment of the invention illustrated in operable relationship with the earth; and FIG. 2 is an electrical schematic diagram of another embodiment of the invention similar to FIG. 1.

With reference now to FIG. 1, there is shown a shot hole 5 which is drilled from the earth's surface 1 to a suitable depth in accordance with usual practice. Preferably, the shot hole 5 penetrates through the weathered layer of the earth so that seismic charges can be positioned below the weathered layer. Suspended in the shot hole 5 at various levels therein are an uppermost master seismic charge 7 and one or more lower slave charges, here designated by the reference numerals 11A and 11B. An explosive charge detonating device is connected to each of the explosive charges, which detonating devices are here designated by the reference numerals 9A and 9B. Electrical power for these detonating devices 9A and 9B is derived from a power source 13 through electrical lead 15. Detonating devices and power sources suitable for use with the invention are described in U.S. Patent 3,100,444, J. D. Ball et al. It is sufficient here to say that the detonating devices produce an electrical signal responsive to detection of seismic waves thereby which detonate the seismic charges connected thereto. The detonating devices remain in operable condition for a predetermined time interval after severance thereof by detonation of the master explosive charge 7. The spacing between the various explosive charges 7, 9A, and 9B is preferably substantially a quarter wave length of the dominant seismic waves produced by the explosive charges.

An electrical actuating signal for detonating the master explosive charge 7 is derived from a conventional seismic recorder 61 at the beginning of a seismic recording interval thereof, through electrical lead 25. The seismic recorder is also provided with a plurality of terminals 63 for connection to a multiplicity of geophones linearly disposed on the earth's surface in the usual manner. While only four terminals 63 are illustrated, it is to be understood that the recorder will be provided with a much larger number, typically 12, 24 or 48, to accommodate the large number of geophones conventionally used in such an array. The electrical signal applied to line 25 is usually derived by means of a cam-actuated switch which is connected to an electrical current source and closed at the beginning of the seismic recording interval. It is conventional for the current pulse produced by the switch to be recorded by recorder 61.

A plurality of metal spike electrodes, or earth contact means, designated by reference numerals 3, 17, 19, and 21, function to detect electrical currents or electromagnetic waves in the earth. Electrode 17 is positioned immediately adjacent the opening of borehole 5 at the earth's surface, and electrodes 3 and 19 are positioned an equal distance away from shot hole 5 on both sides of the shot hole. Electrode 21 is positioned a distance away from electrode 17 equal to the distance between electrodes 3 and 19. The electrical potential between electrodes 17 and 21 is coupled to the primary winding of a transformer 53 by means of a potentiometer 43. Electrode 21 is connected to tap 41 on potentiometer 43, and the potentiometer is connected across winding 53 so that potentiometer 43 can adjust the magnitude of the voltage applied to winding 53. Transformer 49 is provided with two primary windings 51 and 53 and a secondary winding 55. The secondary winding is shunted by a capacitor 57, and the output signal thereacross is coupled to a tuned amplifier 59. The output from amplifier 59 is coupled to a recording head (not shown) of recorder 61, and the output signal of amplifier 59 is recorded by recorder 61 as a separate data trace from the traces of the geophone signals coupled to terminals 63 but on the same time scale as the traces of the geophone signals. The potential existing between electrodes 3 and 19 is coupled to primary winding 51 through cascade-connected potentiometers 47 and 39. Potentiometer 47 is connected across primary winding 51, and potentiometer 39 is connected between the tap 45 of potentiometer 47 and one side of the potentiometer 47 and primary winding 51. The function of potentiometer 47 is to adjust the amplitude of the electrical signal applied to the winding 51. The function of potentiometer 39 is to adjust the phase of the signal applied to potentiometer 51. This is accomplished by connecting the tap 37 of potentiometer 39 to the electrode 17 through a capacitor 31. The phase of the signal applied to winding 51 can be varied by adjusting the tap 37 along the potentiometer 39. Potentiometer tap 45 also is connected to electrode 3. The common junction of potentiometers 39 and 47 and winding 51 is connected to electrode 19. The tuned amplifier 59 preferably is adjusted so as to pass electrical signals in the frequency range of 3 to 10 kilocycles. However, if it is so desired, a broader range of frequencies may be passed by the amplifier, but it will not be found advantageous to pass frequencies outside of the range of 3 to 15 kilocycles. Potentiometrs 43, 47, 39 preferably should have resistances in the range of 100,000 ohms to 1 megohm. Capacitor 31 should have a capacitance between .001 and .05 microfarad, and preferably about .01 microfarad. The capacitance of capacitor 57 should be such as to resonate the secondary winding to a desired frequency, preferably in the range of 3 to 10 kilocycles.

It should be noted that potentiometers 43 and 47 can be connected so that the taps thereof are connected to one side of the winding corresponding thereto, with the outer potentiometer terminal thus being connected between electrodes 3 and 19 and between electrodes 17 and 19, as appropriate.

The operation of the apparatus described above is as follows. After the electrodes 3, 17, 19, and 21 have been driven into the ground, potentiometer taps 41, 45, and 37 are adjusted so that the noise signal induced across the secondary winding 55 is at a minimum. An oscilloscope may be connected across the secondary winding for the purpose of making this determination. It is to be noted that the noise signal induced in winding 53 by electrodes 17 and 21 is of approximately the opposite polarity to the signal induced in winding 51 from electrodes 3 and 19. The tap 37 on potentiometer 39 is varied until the signals are of exactly opposite polarity, and the potentiometer taps 41 and 45 are adjusted until the signals are of substantially equal amplitude so that the noise signals will cancel each other in secondary winding 55 of transformer 49. Potentiometer tap 41 is also adjusted to produce a signal of desired amplitude in the secondary winding responsive to the detonation of explosive charges 7, 11A, and 11B, as described below. Of necessity, this adjustment will have to be done on the basis of experience.

At the beginning of a recording interval, recorder 61 is activated to produce a current pulse on line 25 for detonating an explosive charge 7. Between 10 and 100 microseconds thereafter, exploseive charges 11A and 11B will be detonated when the seimic waves produced by explosive charge 7 are detected by seismic wave responsive explosive charge detonating devices 9A and 9B. When each explosive charge is detonated, an electromagnetic pulse will be produced in the hot gases thereof and each pulse will be coupled to the earth and transmitted to the various current electrodes 3, 17, 19, and 21. Since the electromagnetic impulse produced by the explosive charges arrives at electrodes 3 and 19 at the same time, the electrodes 3 and 19 will, in effect, "see" the electromagnetic impulse at the same phase and amplitude, and hence, there will be no signal current produced thereby through winding 51. However, there will be a relative polarity difference between electrodes 17 and 21 so that a strong signal current flows through winding 53. This signal current will have frequencies in the range of 1 to 50 kilocycles, which will be concentrated in the range of 3 to 10 kilocycles. This signal is coupled to secondary winding 55 and passes through tuned amplifier 59 for recordation by recorder 61. The decay time of the individual signal pulses produced by explosive charges 7, 11A, and 11B is of the order of 3 milliseconds so that the trace produced by amplifier 59 on the recording medium of recorder 61 will comprise a number of very high frequency pulses which are separated in time by many microseconds so that they will be easily identifiable. Since the decay time of each of the impulses is so very short, the exact time at which the explosive charges were detonated relative to the beginning of the recording interval is easily determined.

In the embodiment of FIG. 2, components having the same function as in the embodiment of FIG. 1 are given identical reference numerals. Thus, tuned amplifier 59, recorder 61, explosive charges 7, 11A, and 11B, accoustically-actuated detonating devices 9A and 9B, and power supply 13 are the same as in the embodiment of FIG. 1. However, in the embodiment of FIG. 2, only three electrodes 2, 4, and 6 are utilized. Electrode 4 is positioned near the opening of the borehole 5 at the earth's surface 1, and electrodes 2 and 6 are positioned on opposite sides of the borehole at equal distances therefrom. The spacing of the electrodes 2 and 6 from the borehole preferably is between 100 and 300 feet. An amplifier of special design is used to couple the voltages between electrodes 2 and 4 and electrodes 6 and 4 to tuned amplifier 59. This amplifier makes use of a pair of electrical valves, here shown as triode vacuum tubes 83 and 91. It is to be understood, however, that transistors or other electrical valve means may be utilized. Collector electrodes, here shown as plate electrodes 89 and 97 of vacuum tubes 83 and 91, respectively, are coupled to a source of plate voltage through a common plate resistor 99. The control grids 87 and 95 are connected together by means of a potentiometer 81. Earth electrodes 2 and 6 are connected to grid 87 by series-connected resistor 87A and capacitor 87B, and are connected to grid 95 by series-connected resistor 93A and capacitor 93B. It has been found that a D.C. potential is developed on electrodes 2 and 6 which can seriously unbalance the circuit unless capacitors 87B, 93B (which may be of the order of .01 mfd.) are included. Resistors 87A, 93A, which may be one megohm each, are necessary as a load impedance to permit phase adjustment, as described below. Emitter electrodes, here shown as cathodes 85 and 93, are connected together by means of a potentiometer 77. Adjustable tap 75 is connected to the negative terminal of the plate voltage source and also to the ground electrode 4. The adjustable tap 79 of potentiometer 81 is connected to the ground electrode 4 through a capacitor 73. The function of capacitor 73 and potentiometer 81 is to adjust the phase relationship between the amplified signals appearing at the output of vacuum tubes 83 and 91. Potentiometer 77 is for the purpose of adjusting the relative amplitudes of the signals produced by vacuum tubes 83 and 91.

Before the recorder 61 is activated, potentiometer taps 75 and 79 are adjusted so that substantially zero output signal appears at the output of amplifier 59 as the result of stray or noise signals picked up by the electrodes 2, 4, and 6. Potentiometer tap 75 is adjusted until the signals are of substantially equal amplitude, and potentiometer tap 79 is adjusted so that the relative output signals of the vacuum tubes have substantially opposite phase relationship. Therefore, the signals will cancel each other. An oscilloscope may be applied at either the input or the output of amplifier 59 when this determination is made.

Recorder 61 is now activated to apply a current pulse to line 25 at the beginning of a recording interval, as described above with regard to FIG. 1. Explosive charges 7, 11A, and 11B are detonated in sequence to produce high frequency electrical or electromagnetic current pulses in the earth. The signals between electrodes 2, 4, and the signals between electrodes 6, 4 are of substantially equal amplitude and of the same phase relationship and will be additive in the output of the vacuum tubes 83 and 91. Therefore, a strong signal current will be applied to tuned amplifier 59 for recordation by recorder 61.

Another method for detecting the signals produced upon detonation of the explosive charges is to position a ferrite rod antenna approximately 3 or 4 feet long with several thousand turns of wire thereon tuned to a frequency between 3 and 10 kilocycles and feeding amplifier 59. The antenna must be placed vertically nearly over the shot hole for the reason that the vertical position eliminates the majority of static noise by polarization.

Although the embodiments disclosed in the preceding specification are preferred, other modifications will be apparent to those skilled in the art which do not depart from the scope of the broadest aspects of the invention.

What is claimed is:
1. The method of transmitting time information from one location to another comprising detonating an explosive charge at one location, and, at said other location, detecting and recording as a time record trace radio frequency waves produced by said explosive charge upon detonation thereof at said other location.

2. The method of producing at a first location an indication of the occurrence of a seismic event at a second remote location comprising:
   detecting acoustic waves produced by the occurrence of said event at said second location;
   detonating an explosive charge responsive to detection of said event;
   detecting at said first location the arrival of radio frequency waves of the frequency of radio frequency waves produced by said explosive charge upon detonation thereof; and
   producing a time-calibrated record trace of said detection of radio frequency waves.

3. In the method of initiating seismic waves in connection with seismic exploration of the earth wherein a plurality of explosive charges are vertically spaced apart at different levels in the earth, one of the explosive charges is detonated, and each of the other explosive charges is detonated responsive to arrival thereat of the seismic waves produced by said one explosive charge, the improved method of determining the instant of detonation of each of said explosive charges, comprising:
   at the earth's surface above said explosive charges detecting electromagnetic waves produced by said explosive charges upon detonation and having frequencies in the range of 3 to 10 kilocycles, and producing an electrical signal responsive to said detection; and
   producing a record trace of said electrical signal.

4. In the seismic exploration of the earth wherein a plurality of explosive charges are vertically spaced apart at different levels in the earth, one of the explosive charges is detonated, and each of the other explosive charges is detonated responsive to arrival thereat of seismic waves produced by said one explosive charge, improved apparatus for determining the instants of detonation of each of said explosive charges, comprising:
   first means at the earth's surface for detecting electromagnetic signals produced by said explosive charges upon detonation having frequencies in the range of 3 to 10 kilocycles, and for producing an electrical signal responsive to signals in said range; and
   means connected to said first means for producing a record trace of said electrical signals as a function of time.

5. In the seismic exploration of the earth wherein a plurality of explosive charges are vertically spaced apart in a shot hole at different levels in the earth, one of the explosive charges is detonated, and each of the other explosive charges is detonated responsive to arrival thereat of seismic waves produced by said one explosive charge, improved apparatus for determining the instants of detonation of each of said explosive charges, comprising:
   first and second electrical contact means connected to the earth at points equally spaced from said shot hole;
   third earth contact means for connection to the earth immediately adjacent said shot hole;
   fourth earth contact means for connection to the earth at a location spaced from said third contact means by a distance equal to the distance between said first and second earth contact means;
   circuit means connected to said first, second, third, and fourth earth contact means for canceling random field signals between said third and fourth earth contact means with the random field signals between said first and second earth contact means and for producing an electrical output signal responsive to electrical signals of predetermined frequencies produced by detonation of said explosive charges; and
   means connected to said circuit means for detonating said one explosive charge and for producing a record trace of the output signals of said circuit means as a function of time.

6. In the seismic exploration of the earth wherein a plurality of explosive charges are vertically spaced apart in a shot hole of different levels in the earth, one of the explosive charges is detonated, and each of the other explosive charges is detonated responsive to arrival thereat of seismic waves produced by said one explosive charge, improved apparatus for determining the instants of detonation of each of said explosive charges, comprising:
   first and second electrical contact means connected to the earth at points equally spaced from said shot hole;
   third earth contact means for connection to the earth immediately adjacent said shot hole;
   fourth earth contact means for connection to the earth at a location spaced from said third contact means by a distance equal to the distance between said first and second earth contact means;
   transformer means having first and second primary windings and a secondary winding;
   means for recording as a function of time output signals of predetermined frequencies from said secondary winding;
   said first primary winding being connected between said first and second earth contact means, and said second primary winding being connected between said third and fourth earth contact means such that a random earth current will produce voltages of opposite polarity in said secondary winding;

a first potentiometer having a variable tap, said first potentiometer being connected across said first primary winding;

a second potentiometer having a variable tap, said second potentiometer being connected between one of said first and second earth contact means and said first potentiometer variable tap; and first capacitor means connected between said second potentiometer variable tap and said third earth contact means, and second capacitor means connected across said secondary winding.

7. In the seismic exploration of the earth wherein a plurality of explosive charges are vertically spaced apart in a shot hole at different levels in the earth, one of the explosive charges is detonated, and each of the other explosive charges is detonated responsive to arrival thereat of seismic waves produced by said one explosive charge, improved apparatus for determining the instants of detonation of each of said explosive charges, comprising:

first and second electrical contact means connected to the earth at points equally spaced from said shot hole;

third earth contact means for connection to the earth immediately adjacent said shot hole;

amplifier means including first and second electrical valve means, each having an emitter electrode, a collector electrode, and a control electrode, said control electrode being respectively connected to said first and second earth contact means;

means for recording the output signals of said amplifier means as a function of time;

a first potentiometer having a variable tap connected to said third earth contact means, connected between said emitter electrodes;

capacitor means; and second potentionmeter connected between said control electrodes, having a variable tap connected to said third earth contact means through said capacitor means.

References Cited by the Examiner

UNITED STATES PATENTS

| | | | |
|---|---|---|---|
| 1,843,725 | 2/1932 | Karcher | 181—.5 |
| 2,276,974 | 3/1942 | Howard | 181—.5 |
| 2,805,727 | 9/1957 | Bazhaw | 181—.5 |
| 3,100,444 | 8/1963 | Ball et al. | 102—21.6 |
| 3,225,858 | 12/1965 | Pfab | 181—.5 |

OTHER REFERENCES

Martner, S. T., et al., "The Electroseismic Effect," Geophysics, vol. XXIV, No. 2 (April 1959), pp. 277–308 (p. 297 relied on).

BENJAMIN A. BORCHELT, *Primary Examiner.*

W. KUJAWA, *Assistant Examiner.*